US012637048B2

(12) United States Patent
Kim

(10) Patent No.: US 12,637,048 B2
(45) Date of Patent: May 26, 2026

(54) ELECTRONIC BRAKE SYSTEM

(71) Applicant: HL MANDO CORPORATION, Gyeonggi-do (KR)

(72) Inventor: Jin Seok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 1331 days.

(21) Appl. No.: 17/296,223

(22) PCT Filed: Nov. 22, 2019

(86) PCT No.: PCT/KR2019/016176
§ 371 (c)(1),
(2) Date: May 22, 2021

(87) PCT Pub. No.: WO2020/106110
PCT Pub. Date: May 28, 2020

(65) Prior Publication Data
US 2022/0017051 A1 Jan. 20, 2022

(30) Foreign Application Priority Data
Nov. 23, 2018 (KR) ........................ 10-2018-0146154

(51) Int. Cl.
*B60T 8/32* (2006.01)
*B60T 8/17* (2006.01)
(Continued)

(52) U.S. Cl.
CPC ................ *B60T 8/326* (2013.01); *B60T 8/17* (2013.01); *B60T 8/4081* (2013.01); *B60T 13/14* (2013.01);
(Continued)

(58) Field of Classification Search
CPC .. B60T 15/16; B60T 13/686; B60T 2270/402; B60T 8/17; B60T 13/62;
(Continued)

(56) References Cited

U.S. PATENT DOCUMENTS 6,494,546 B1 * 12/2002 Feigel ................... B60T 17/222
303/114.1
6,582,030 B2 * 6/2003 Harris ..................... B60T 13/58
303/3

(Continued)

FOREIGN PATENT DOCUMENTS

DE 102009033499 A1 * 1/2010 ........... B60T 13/686
KR 101134901 B1 * 4/2012
(Continued)

OTHER PUBLICATIONS

WO 2020184968 A1 (Year: 2020).*
(Continued)

*Primary Examiner* — Robert A. Siconolfi
*Assistant Examiner* — Mahbubur Rashid
(74) *Attorney, Agent, or Firm* — WOMBLE BOND DICKINSON (US) LLP

(57) ABSTRACT

Provided is an electronic brake system including, a master cylinder including a first piston connected to a pedal and a second piston configured to partition a first master chamber and a second master chamber provided in front of the first piston, a reservoir in which a braking fluid is stored, the reservoir connected to the first master chamber by a first reservoir passage, and connected the second master chamber by a second reservoir passage, a hydraulic pressure supply device configured to generate a hydraulic pressure by an electrical signal output in response to a displacement of the pedal, a first connection line configured to connect the first master chamber to a first hydraulic circuit, a second con-
(Continued)

nection line configured to connect the second master chamber to a second hydraulic circuit, and a third connection line configured to connect the hydraulic pressure supply device to the reservoir, wherein a mechanical part including the reservoir and the master cylinder is installed in a first block, and an electronic part including the hydraulic pressure supply device and the first hydraulic circuit, the second hydraulic circuit is installed in a second block, and each of the first connection line, the second connection line, and the third connection line is provided to connect the first block to the second block.

16 Claims, 5 Drawing Sheets

(51) Int. Cl.
| | | |
|---|---|---|
| *B60T 8/40* | (2006.01) | |
| *B60T 13/14* | (2006.01) | |
| *B60T 13/62* | (2006.01) | |
| *B60T 13/68* | (2006.01) | |
| *B60T 15/02* | (2006.01) | |
| *B60T 17/04* | (2006.01) | |

(52) U.S. Cl.
CPC ............ *B60T 13/142* (2013.01); *B60T 13/62* (2013.01); *B60T 13/686* (2013.01); *B60T 15/028* (2013.01); *B60T 17/04* (2013.01); *B60T 2270/402* (2013.01); *B60T 2270/404* (2013.01); *B60T 2270/82* (2013.01)

(58) Field of Classification Search
CPC .... B60T 2220/04; B60T 13/14; B60T 13/142; B60T 2270/82; B60T 2270/404; B60T 8/326; B60T 8/4081; B60T 15/028; B60T 17/04
See application file for complete search history.

(56) References Cited

U.S. PATENT DOCUMENTS

| | | | | |
|---|---|---|---|---|
| 6,860,569 | B1 * | 3/2005 | Campau | B60T 8/4081 303/114.1 |
| 8,757,734 | B2 * | 6/2014 | Toyohira | B60T 7/042 303/119.3 |
| 8,911,030 | B2 * | 12/2014 | Ohnishi | B60T 8/4081 303/114.1 |
| 9,321,444 | B2 * | 4/2016 | Ganzel | B60T 7/042 |

| | | | | |
|---|---|---|---|---|
| 9,340,193 | B2 * | 5/2016 | Ganzel | B60T 13/686 |
| 9,393,875 | B2 * | 7/2016 | Okano | B60L 7/26 |
| 9,937,910 | B2 * | 4/2018 | Kuhlman | B60T 7/042 |
| 10,981,552 | B2 * | 4/2021 | Ganzel | B60T 13/166 |
| 2010/0270854 | A1 * | 10/2010 | Okano | B60T 8/4081 303/3 |
| 2011/0254360 | A1 * | 10/2011 | Klimes | B60T 13/662 303/10 |
| 2013/0312404 | A1 * | 11/2013 | Ganzel | F15B 15/00 60/533 |
| 2014/0346852 | A1 * | 11/2014 | Thrasher | B60T 8/4081 303/10 |
| 2015/0021981 | A1 * | 1/2015 | Shimada | B60T 8/176 303/121 |
| 2015/0120161 | A1 * | 4/2015 | Kamiya | B60T 13/662 60/553 |
| 2016/0023644 | A1 * | 1/2016 | Feigel | B60T 8/4081 303/3 |
| 2017/0137006 | A1 | 5/2017 | Kuhlman | |
| 2018/0072291 | A1 | 3/2018 | Ishida | |
| 2018/0244253 | A1 * | 8/2018 | Kobayashi | B60T 8/17 |

FOREIGN PATENT DOCUMENTS

| | | | |
|---|---|---|---|
| KR | 101239706 | B1 * | 3/2013 |
| KR | 10-2014-0134016 | | 11/2014 |
| KR | 10-2014-0143887 | | 12/2014 |
| KR | 10-1684132 | | 12/2016 |
| KR | 10-2017-0066726 | | 6/2017 |
| KR | 10-2018-0019272 | | 2/2018 |
| KR | 10-1853771 | | 5/2018 |

OTHER PUBLICATIONS

KR 101853771 B1 (Year: 2018).*
KR 101239706 B1 (Year: 2013).*
DE 102016203563 A1 (Year: 2017).*
International Search Report for PCT/KR2019/016176 mailed on Mar. 17, 2020 and its English translation from WIPO (now published as WO 2020/106110).
Written Opinion of the International Searching Authority for PCT/KR2019/016176 mailed on Mar. 17, 2020 and its English translation from WIPO (now published as WO 2020/106110).
Office Action dated May 30, 2023 for Korean Patent Application No. 10-2018-0146154 and its English translation provided by the Applicant's foreign counsel.
International Preliminary Report on Patentability (Chapter I) for PCT/KR2019/016176 issued on May 25, 2021 and its English translation from WIPO (published as WO 2020/106110).
Office Action dated Jul. 29, 2024 for Korean Patent Application No. 10-2018-0146154 and its English translation from Global Dossier.

* cited by examiner

[FIG. 1]
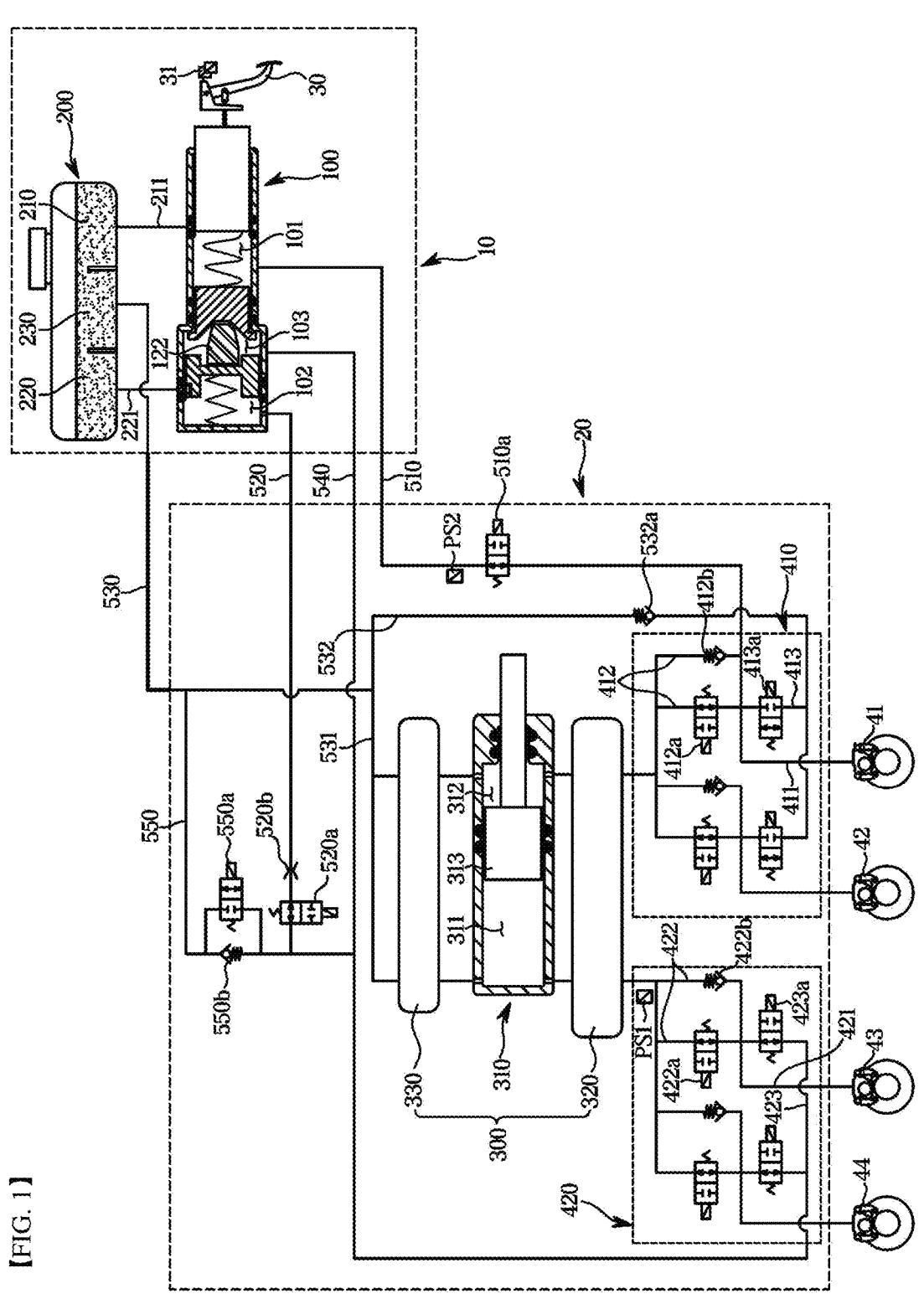

【FIG. 2】
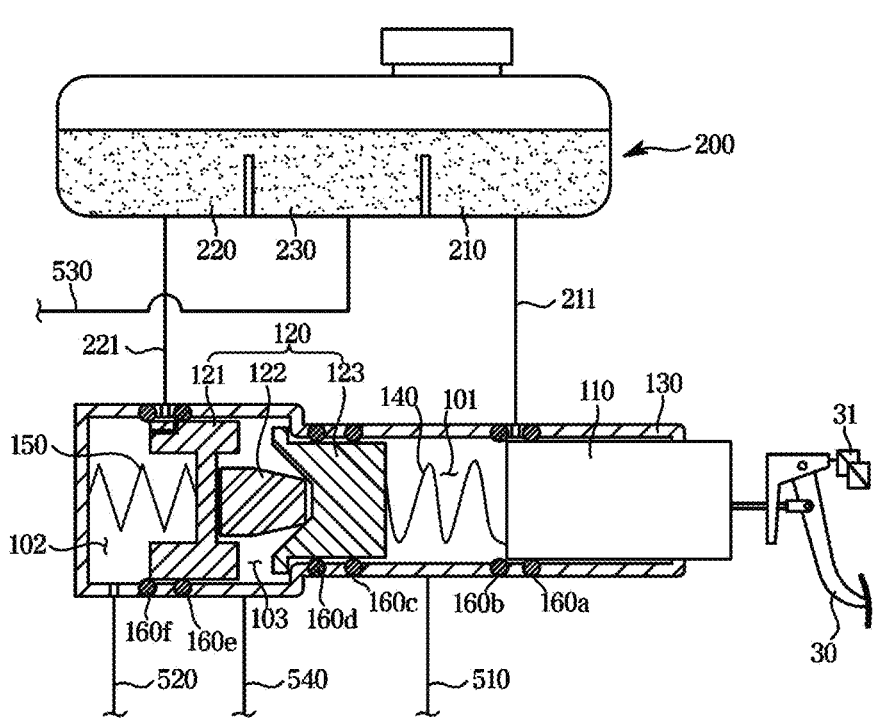

[FIG. 3]
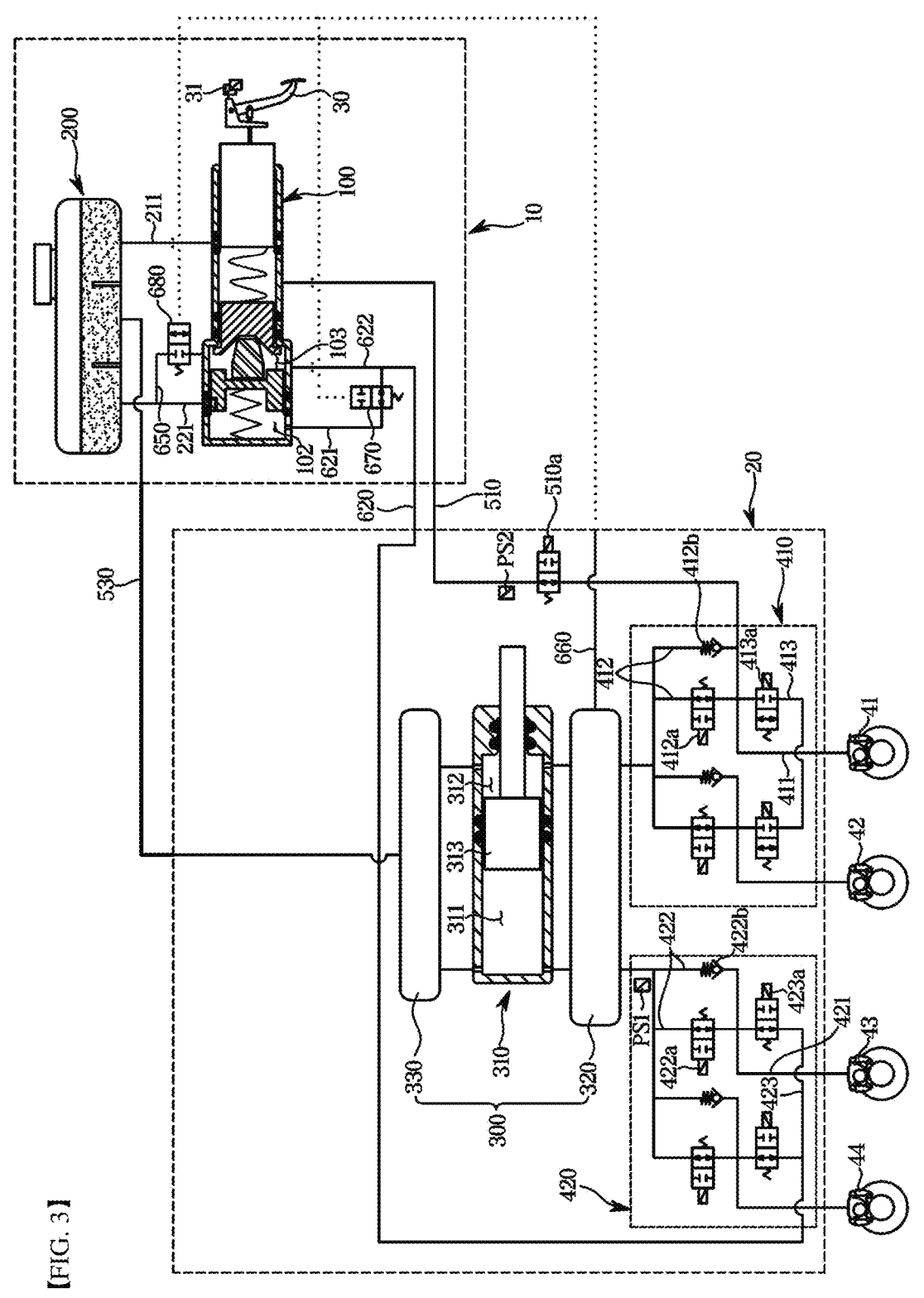

【FIG. 4】
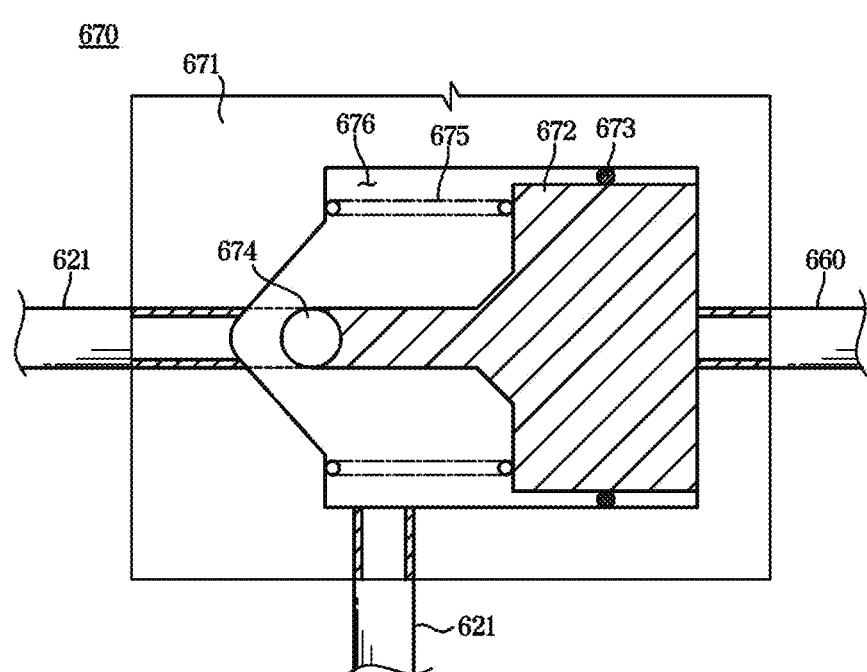

[FIG. 5]
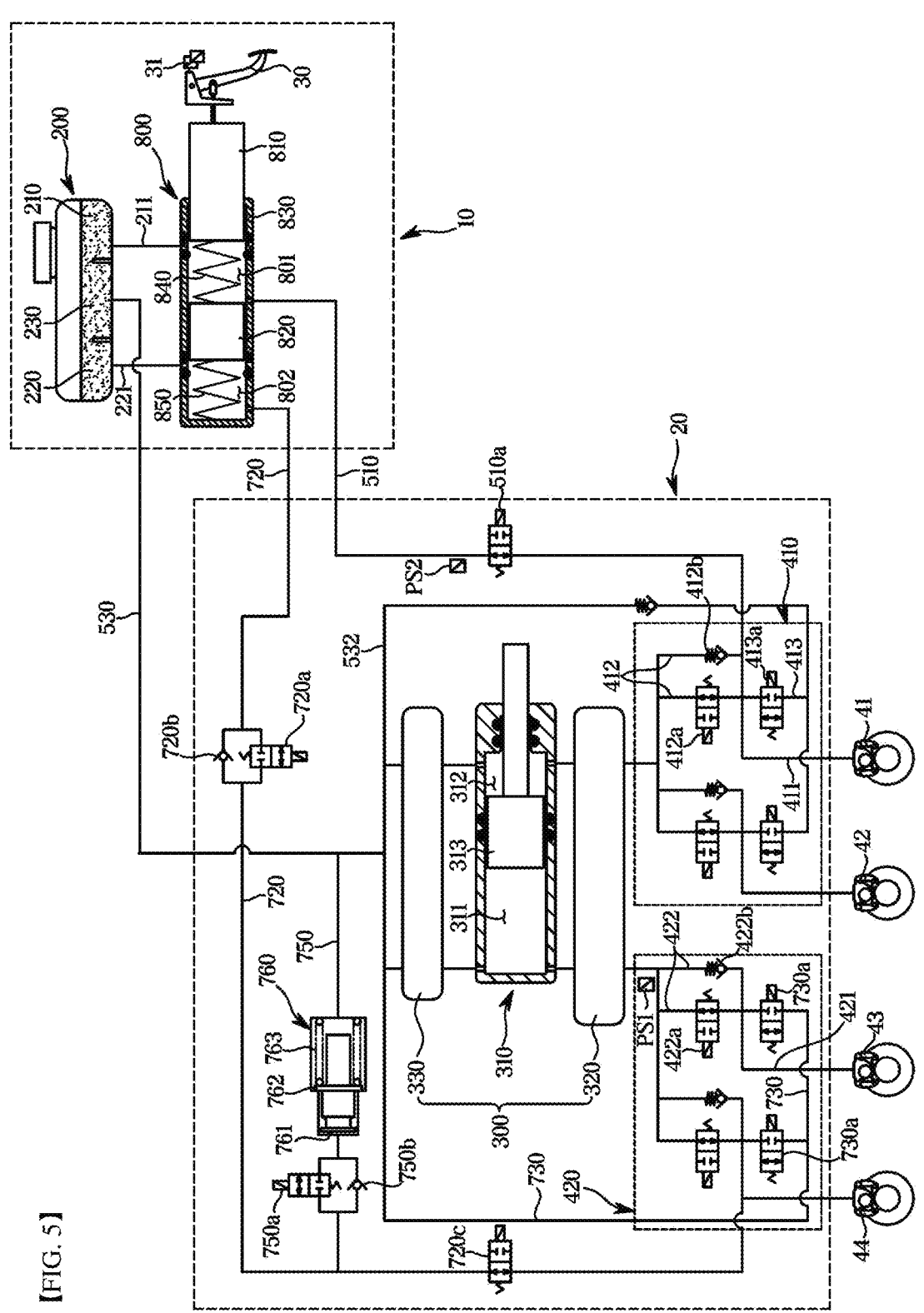

ELECTRONIC BRAKE SYSTEM

CROSS-REFERENCE TO RELATED APPLICATIONS

This application is the U.S. National Stage of International Patent Application No. PCT/KR2019/016176 filed on Nov. 22, 2019, which claims the priority to Korean Patent Application No. 10-2018-0146154 filed in the Korean Intellectual Property Office on Nov. 23, 2018, the entire contents of which are incorporated herein by reference.

TECHNICAL FIELD

The present invention relates to an electronic brake system for generating a braking force using an electrical signal corresponding to a displacement of a brake pedal.

BACKGROUND ART

Vehicles are equipped with a brake system for performing braking, and various types of brake systems have been proposed for the safety of drivers and passengers.

The conventional brake system mainly uses a method that, based on a brake pedal being pressed by a driver, supplies a hydraulic pressure required for braking to a wheel cylinder using a mechanically connected booster. However, recently, there is an increasing use of an electronic brake system including a hydraulic pressure supply device that receives the driver's braking intention as an electrical signal from a pedal displacement sensor that senses the displacement of the brake pedal when the driver presses the brake pedal and supplies the hydraulic pressure required for braking to the wheel cylinders.

In a normal operation mode of such an electronic brake system, the driver's brake pedal operation is not directly linked to the wheel cylinder, so there is a provided a pedal simulator that provides a pedal feel to the driver in response to operation of the brake pedal. The pedal simulator, when the driver applies a foot force for the operation of the brake pedal, provides a reaction force to the driver so that the driver may receive a familiar and comfortable feeling of the brake pedal.

On the contrary, when a technical malfunction occurs in a part of the electronic brake system, the system enters an abnormal operation mode, and requires a mechanism in which the driver's brake pedal operation is directly linked to the wheel cylinder. That is, in the abnormal operation mode of the electronic brake system, when the driver applies a step force for the operation of the brake pedal, the brake pedal needs to directly transmit the braking fluid to the wheel cylinder.

On the other hand, conventionally, in mounting a brake system module inside the vehicle, the degree of freedom to vehicle design is limited due to the large size of the module. To resolve such a limitation, studies have been conducted on a method of maintaining the operation performance of the brake while reducing the module connected to the pedal.

DISCLOSURE

Technical Problem

Therefore, it is an object of the disclosure to provide an electronic brake system that is capable of reducing the size, the number of parts, and weight of the product.

It is another object of the disclosure to provide an electronic brake system that is capable of improving product assembly and productivity while reducing the manufacturing cost of the product.

According to an aspect of the disclosure, there is provided an electronic brake system including: a master cylinder including a first piston connected to a pedal and a second piston configured to partition a first master chamber and a second master chamber provided in front of the first piston; a reservoir in which a braking fluid is stored, the reservoir connected to the first master chamber by a first reservoir passage, and connected the second master chamber by a second reservoir passage; a hydraulic pressure supply device configured to generate a hydraulic pressure by an electrical signal output in response to a displacement of the pedal; an electronic control unit configured to control the hydraulic pressure supply device and various valves based on pedal displacement information; a first connection line configured to connect the first master chamber to a first hydraulic circuit for controlling a hydraulic pressure transmitted to one pair of wheel cylinders; a second connection line configured to connect the second master chamber to a second hydraulic circuit for controlling a hydraulic pressure transmitted to another pair of wheel cylinders; and a third connection line configured to connect the hydraulic pressure supply device to the reservoir, wherein a mechanical part including the reservoir and the master cylinder is installed in a first block, and an electronic part including the hydraulic pressure supply device, the first hydraulic circuit, the second hydraulic circuit, and the electronic control unit is installed in a second block, and each of the first connection line, the second connection line, and the third connection line is provided to connect the first block to the second block.

The first and second hydraulic circuits may include: a wheel line connected to the wheel cylinder; an inlet line provided with a check valve, which allows only a one-way fluid movement from the wheel line toward the hydraulic pressure supply device, and a normally open inlet valve in parallel; and an outlet line provided with an outlet valve and connected to the wheel line.

The second piston may include a reaction force piston provided to be displaceable by a hydraulic pressure of the braking fluid accommodated in the first master chamber, a damping piston configured to change a volume of the second master chamber, and an elastic member arranged between the reaction force piston and the damping piston, wherein the master cylinder may be an integrated master cylinder that incorporates a simulation device, and may include a simulation chamber provided between the reaction force piston and the damping piston and accommodating the elastic member.

The first connection line may be provided with a first cut valve and connects the first master chamber to the wheel line of the first hydraulic circuit; the second connection line may be provided with a second cut valve and connects the second master chamber to the outlet line of the second hydraulic circuit; the outlet line of the first hydraulic circuit may be connected to the third connection line inside the second block; the outlet valve of the first hydraulic circuit may be a normally closed solenoid valve; and the outlet valve of the second hydraulic circuit may be a normally open solenoid valve.

The second connection line may be provided with an orifice between the second cut valve and the second master chamber.

The electronic brake system may further include a fourth connection line provided to connect the first block to the second block, and connect the simulation chamber to the outlet line of the second hydraulic circuit.

The electronic brake system may further include a simulation line configured to connect the fourth connection line to the reservoir, wherein the simulation line may be provided with a simulator valve and a check valve arranged in parallel.

The first connection line may be provided with a first cut valve and connects the first master chamber to the wheel line of the first hydraulic circuit; the second connection line may be provided with a first pipeline and a second pipeline, which are connected to the second master chamber and the simulation chamber, respectively, and join each other and extend toward the outlet line of the second hydraulic circuit; the first pipeline may be provided with a first mechanical valve; the outlet valve of the first hydraulic circuit may be a normally closed solenoid valve; and the outlet valve of the second hydraulic circuit may be a normally open solenoid valve.

The electronic brake system may further include a third pipeline provided with a second mechanical valve and connecting the second reservoir passage to the simulation chamber.

The electronic brake system may further include a fourth pipeline configured to connect the hydraulic pressure supply device to the first and second mechanical valves, wherein the first and second mechanical valves may be each provided as a hydraulic operating valve that is normally opened by a piston pressurized by a spring inside a housing and blocks a passage by an opening and closing member provided on the piston when a hydraulic pressure is supplied to the fourth pipeline.

The outlet line of the first hydraulic circuit may be connected to the outlet line of the second hydraulic circuit to extend to the second connection line.

The first connection line may be provided with a first cut valve, and connects the first master chamber to the wheel line of the first hydraulic circuit; the second connection line may be provided with a second cut valve, and connect the second master chamber to the outlet line of the second hydraulic circuit; the outlet line of the first hydraulic circuit and the outlet line of the second hydraulic circuit may be connected to the third connection line inside the second block; and the outlet valve of the first hydraulic circuit and the outlet valve of the second hydraulic circuit may be each provided as a normally closed solenoid valve.

The electronic brake system may further include a simulator line provided with a simulator device and connecting the second connection line to the third connection line.

The simulator line may be provided with a simulator valve and a check valve that are installed in parallel between the second connection line and the simulator device.

The simulator device may include: a simulator chamber provided to store oil; a reaction force piston configured to change a volume of the simulator chamber; and a reaction force spring configured to provide an elastic force to the reaction force piston.

The second connection line may be provided with an inspection valve and a check valve arranged in parallel between a joining point of the simulator line and the second master chamber.

The hydraulic pressure supply device may include: a hydraulic pressure supply portion provided with a first pressure chamber and a second pressure chamber; a control valve portion provided with various valves for adjusting a hydraulic pressure supplied from the hydraulic pressure supply portion toward the first and second hydraulic circuits;

and a dump valve portion provided with various valves for adjusting a hydraulic pressure supplied from the hydraulic pressure supply portion toward the third connection line.

A part of the first connection line connecting the first block to the second block may include a hose that allows a large flow rate and has a resilience.

Advantageous Effects

As is apparent from the above, since a first block including a mechanical part and a second block including an electronic part are separately provided from each other, the electronic brake system can be easily installed in a narrow engine room of a vehicle while maintaining stable braking performance.

In addition, since the first block and the second block are connected to each other using only three or four connection lines, an interference caused by the connection lines in mounting the brake system module inside the vehicle can be reduced.

In addition, since the second block is mounted in an arbitrary position, the degree of freedom to installation and design can be improved, and the same system can be applied to Left-hand drive (LHD)/Right-hand drive (RHD) vehicles, so that development of vehicles can be facilitated.

In addition, since the second block is installed at a position far from the driver's seat or spaced apart from the vehicle body, the noise can be fundamentally eliminated.

In addition, since only the second block part, which is an electronic part, is separately produced, the present invention can be applied to mass production of full-autonomous driving vehicles.

DESCRIPTION OF DRAWINGS

The present invention will be described in detail by the following drawings, but since these drawings show preferred embodiments of the present invention, the technical idea of the present invention should not be interpreted only based on the drawings.

FIG. 1 is a hydraulic circuit diagram of an electronic brake system according to the first embodiment of the present invention.

FIG. 2 is an enlarged view of a first block according to the first embodiment of the present invention.

FIG. 3 is a hydraulic circuit diagram of an electronic brake system according to the second embodiment of the present invention.

FIG. 4 is a conceptual diagram of a mechanical block according to the second embodiment of the present invention.

FIG. 5 is a hydraulic circuit diagram of an electronic brake system according to the third embodiment of the present invention.

MODES OF THE DISCLOSURE

Hereinafter, embodiments of the present disclosure will described with reference to the accompanying drawings in detail. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, unrelated parts may be not shown and the sizes of components may be exaggerated for clarity.

FIG. 1 is a hydraulic circuit diagram of an electronic brake system according to the first embodiment of the present invention, and FIG. 2 is an enlarged view of a first block 10 according to the first embodiment of the present invention.

Referring to the drawing, FIG. 1, an electronic brake system according to the first embodiment of the present invention is largely divided into a master cylinder 100, a reservoir 200, a hydraulic pressure supply device 300 for generating a hydraulic pressure by operating a hydraulic piston 313 based on an electrical signal output in response to a displacement of a pedal 30, and first to fourth connection lines 510, 520, 530 and 540 connecting a first block 10 to a second block 20.

The first block 10 is a module in which mechanical components including machinery components are installed, and the second block 20 is a module in which electronic components including solenoid valves are installed, and the first block 10 and the second block 20 are spaced apart from each other inside a vehicle to physically separate a mechanical part from an electronic part in the vehicle. In this case, the first block 10 and the second block 20 are connected to each other through the first to fourth connection lines 510, 520, 530 and 540 through which a fluid flows.

For example, the mechanical part including the reservoir 200 and the master cylinder 100 is installed in the first block 10, and the electronic part including the hydraulic pressure supply device 300, a first hydraulic circuit 410, and a second hydraulic circuit 420 is installed in the second block 20, and the first connection line 510, the second connection line 520, the third connection line 530, and the fourth connection line 540 are each provided to connect the first block 10 to the second block 20.

The master cylinder 100 includes a first piston 110 connected to the pedal 30 to reciprocate within a cylinder block 130, and a second piston 120 dividing a first master chamber 101 from a second master chamber 102 provided in front of the first piston 110.

The second piston 120 includes a reaction force piston 123 provided to be displaceable by a hydraulic pressure of a braking fluid accommodated in the first master chamber 101, a damping piston 121 provided to change the volume of the second master chamber 102 by reciprocating in a fallback mode, and an elastic member 122 disposed between the reaction force piston 123 and the damping piston. Thereby, the master cylinder 100 includes a simulation chamber 103 accommodating the elastic member 122 and provided between the reaction force piston 123 and the damping piston 121, and serves as an integrated master cylinder that incorporates a simulation device.

The reaction force piston 123 is provided to have a certain range of displacement within the simulation chamber 103 by the hydraulic pressure of the braking fluid pressurized in the first master chamber 101, and the damping piston 121 moves along with the movement of the reaction force piston 123 to pressurize the braking fluid accommodated in the second master chamber 102. The damping piston 121 is provided to pressurize the second master chamber 102, and has the elastic member 122 disposed between the reaction force piston 123 and the damping piston 121, in which the elastic member 122 is formed of material, such as rubber, that may be compressed and expanded according to the displacement of the reaction force piston 123 and the damping piston 121. In addition, a second reaction force spring 150 is provided between a rear side of the damping piston 121 (the left side of the damping piston 121 on the drawing) and the end portion of the master cylinder 100 to elastically support the damping piston 121 and the reaction force piston 123.

Between the first piston 110 and the reaction force piston 123 of the master cylinder 100, a first reaction force spring 140 is provided. When the driver operates the brake pedal 30 so that the displacement is changed, causing the first piston 110 to move, and when the stepping force of the brake pedal 30 is released, the first reaction force spring 140 expands, causing the first piston 110 to return to the original position.

The master cylinder 100 includes first sealing members 160a and 160b disposed before and after a first reservoir passage 211 connected to the first master chamber 101, second sealing members 160c and 160d making contact with the outer circumferential surface of the reaction force piston 123, and third sealing members 160e and 160f disposed before and after a second reservoir passage 221. The sealing members are provided in a ring-shaped structure formed to protrude from the inner wall of the cylinder block 130 or the outer circumferential surfaces of the first piston 110, the reaction force piston 123, and the damping piston 121.

The reservoir 200 includes a first reservoir chamber 210, a second reservoir chamber 220, and a third reservoir chamber 230 in which the braking fluid is stored. The first reservoir passage 211 connects the first master chamber 101 to the first reservoir chamber 210, and the second reservoir passage 221 connects the second master chamber 102 to the second reservoir chamber 220.

The hydraulic pressure supply device 300 includes a hydraulic pressure supply portion 310 provided with a first pressure chamber 311 and a second pressure chamber 312, a control valve portion 320 provided with various valves for adjusting a hydraulic pressure supplied from the hydraulic pressure supply portion 310 toward the first and second hydraulic circuits 410 and 420, and a dump valve portion 330 provided with various valves for adjusting a hydraulic pressure supplied from the hydraulic pressure supply portion 310 to the third connection line 530.

The hydraulic pressure supply portion 310 generates a hydraulic pressure by operating the hydraulic piston 313 based on an electrical signal output in response to the displacement of the pedal 30, and includes the first pressure chamber 311 provided at one side of the hydraulic piston 313 movably accommodated in the housing and connected to one or more wheel cylinders, and the second pressure chamber 312 provided at the other side of the hydraulic piston 313 and connected to one or more wheel cylinders.

The first hydraulic circuit 410 includes a wheel line 411 connected to one pair of wheel cylinders 41 and 42, an inlet line 412 provided with a check valve 412b, which allows only a one-way fluid movement from the wheel line 411 to the hydraulic pressure supply device 300, and a normally open inlet valve 412a in parallel, and an outlet line 413 provided with an outlet valve 413a and connected to the wheel line 411. Similarly, the second hydraulic circuit 410 includes a wheel line 421 connected to the other pair of wheel cylinders 43 and 44, an inlet line 422 provided with a check valve 422b, which allows only a one-way fluid movement from the wheel line 421 to the hydraulic pressure supply device 300, and a normally open inlet valve 422a in parallel, and an outlet line 423 provided with an outlet valve 423a and connected to the wheel line 421.

In the first embodiment, the first connection line 510 connects the first master chamber 101 to the first hydraulic circuit 410, the second connection line 520 connects the second master chamber 102 to the second hydraulic circuit 420, the third connection line 530 connects the hydraulic pressure supply device 300 to the reservoir 200, and the fourth connection line 540 connects the simulation chamber 103 to the outlet line 423 of the second hydraulic circuit 420. In this case, a part of the first connection line 510 connecting the first block 10 to the second block 20 may be formed of a hose that allows a large flow rate and has an elasticity, and the second connection line 520 and the third connection line 530 may be formed of a metal tube. In particular, the third connection line 530 is illustrated as having different thicknesses in the drawing, which indicates that a part connecting the first block 10 to the second block 20 may be formed of a hose.

Specifically, the first connection line 510 is provided with a first cut valve 510a, and connects the first master chamber 101 to the wheel line 411 of the first hydraulic circuit 410. The second connection line 520 is provided with a second cut valve 520a, and connects the second master chamber 102 to the outlet line 423 of the second hydraulic circuit 420. The outlet line 413 of the first hydraulic circuit 410 is connected to the third connection line 530 inside the second block 20, and the outlet valve 413a of the first hydraulic circuit 410 is a normally closed solenoid valve, and the outlet valve 423a of the second hydraulic circuit 420 is a normally open solenoid valve. In this case, the second connection line 520 is provided with an orifice 520b between the second cut valve 520a and the second master chamber 102 to adjust a change in the flow rate of the fluid flowing through the second connection line 520.

The first cut valve 510a and the second cut valve 520a maintain an operating state during a normal operation to close the first connection line 510 and the second connection line 520, and when the system is abnormally operated, that is, upon a fall back mode, opens the passage to mechanically transmit a stepping force of the pedal 30 to the wheel cylinders 41, 42, 43, and 44.

A simulation line 550 connects the fourth connection line 540 to the reservoir 200. In the simulation line 550, a simulator valve 550a and a check valve 550b are provided in parallel. The simulator valve 550a is a normally closed solenoid valve, and maintains an operating state in a normal driving mode to open the simulation line 550 to release the hydraulic pressure in the simulation chamber 103, and in a fallback mode, closes the simulation line 550 so that the hydraulic pressure is filled in the simulation chamber 103.

The third connection line 530 has one side connected to the third reservoir chamber 230 and the other side branched into a hydraulic pressure supply device side dump line 531 and a first hydraulic circuit side dump line 532, so as to, when needed, supply the internal fluid toward the reservoir 200 by operation of the hydraulic pressure supply device 300 and the valves provided in the second hydraulic circuit 420. In this case, the first hydraulic circuit side dump line 532 may be provided with a check valve 532a that allows only a one-way flow toward the reservoir 200.

Meanwhile, the second block 20 may include an electronic control unit (ECU, not shown) that controls the hydraulic pressure supply device and various valves based on hydraulic pressure information and pedal displacement information. The ECU may supply hydraulic pressure to the wheel cylinder or release hydraulic pressure supplied to the wheel cylinder by organically controlling various valves that are electronically operated as described above. In addition, the reference numerals "PS1" and "PS2" indicate pressure sensors, which measure the hydraulic pressure inside the system in real time and transmit the measured information to the ECU to help determine whether to open or close the various valves.

As such, the electronic brake system according to the present invention has the first block 10 including the mechanical part and the second block 20 including the electronic part separately from each other to facilitate installation of the electronic brake system in a narrow engine room of a vehicle while maintaining stable braking performance.

In addition, since only the four connection lines 510, 520, 530, and 540 are used to connect the first block 10 to the second block 20, interference caused by the connection lines when installing the brake system module inside the vehicle may be reduced.

In addition, since the second block 20 is mounted in an arbitrary position, the degree of freedom to installation and design is improved, and the same system may be applied to left-hand drive (LHD)/right-hand drive (RHD) vehicles, so that development of vehicle is facilitated In addition, since the second block 20 is mounted at a location far from the driver's seat or spaced apart from the vehicle body, noise may be fundamentally eliminated. In addition, since only the second block 20, that is, an electronic part, may be separately produced, and applicable to mass production of full-autonomous driving vehicles.

FIG. 3 is a hydraulic circuit diagram of an electronic brake system according to the second embodiment of the present invention, and FIG. 4 is a conceptual diagram of a mechanical block according to the second embodiment of the present invention. The following description is identical to that of the electronic brake system according to the first embodiment, except for the elements assigned different reference numerals, and thus the description of the same elements will be omitted to avoid redundancy.

In the second embodiment, a second connection line 620 has one side connected to the outlet line 423 of the second hydraulic circuit 420 and the other side branched into a first pipeline 621 and a second pipeline 622. In this case, the first pipeline 621 extends toward the second master chamber 102, and the second pipeline 622 extends toward the simulation chamber 103, and the first pipeline 621 is provided with s a first mechanical valve 670.

A third pipeline 650 connects the second reservoir passage 221 to the simulation chamber 103. The third pipeline 650 is provided with a second mechanical valve 680. A fourth pipeline 660 connects the control valve portion 320 of the hydraulic pressure supply device 300 to first and second mechanical valves 670 and 680. In addition, the outlet valve 413a of the first hydraulic circuit 410 is a normally closed solenoid valve, and the outlet valve 423a of the second hydraulic circuit 420 is a normally open solenoid valve.

The outlet line 413 of the first hydraulic circuit 410 is connected to the outlet line 423 of the second hydraulic circuit 420 to extend to the second connection line 620. The second connection line 620 is provided with a check valve 620a to allow only a one-way fluid flow from the outlet line 413 of the first hydraulic circuit 410 to the reservoir 200.

The mechanical valve 670 is provided as a hydraulic operating valve that is maintained in an open state by a piston 672 pressed with a spring 675 in a housing 671, and when a hydraulic pressure is supplied to the fourth pipeline 660, blocks the passage with an opening and closing member 674 provided on the piston 672. In the open state of the mechanical valve 670, a fluid is caused to flow through a chamber 676 to the first pipeline 621.

The opening and closing member 674 provided at a protruding end of the piston 672 extending toward the orifice blocks the flow of a fluid passing through the first pipeline 621 when a hydraulic pressure is supplied to the fourth pipeline 660. In this case, a sealing member 673 is provided on the outer circumferential surface of the piston 672 to prevent separation of the fluid inside the chamber 676.

The second mechanical valve 680 has the same structure as that of the first mechanical valve 670, such as operating to maintain the third pipeline 650 in an open state and when a hydraulic pressure is provided to the fourth pipeline 660, blocking the flow of a fluid toward the third pipeline 650.

FIG. 5 is a hydraulic circuit diagram of an electronic brake system according to the third embodiment of the present invention. The following description is identical to that of the electronic brake system according to the first embodiment, except for the elements assigned different reference numerals, and thus the description of the same elements will be omitted to avoid redundancy.

In the third embodiment, a master cylinder 800 is a tandem master cylinder, and includes a cylinder block 830 in which a first piston 810 and a second piston 820 are accommodated, a first master chamber 801 provided in front of the first piston 810 connected to the pedal 30, a second piston 820 that divides the first master chamber 801 from a second master chamber 802, a first reaction force spring 840 installed between the first piston 810 and the second piston 820, and a second reaction force spring 850 provided between the cylinder block 830 and the second piston 820.

The first connection line 510 is provided with a first cut valve 510a, and connects the first master chamber 801 to the wheel line 411 of the first hydraulic circuit 410, and a second connection line 720 is provided with a second cut valve 720c and connects the second master chamber 802 to the wheel line 421 of the second hydraulic circuit 420. The outlet line 413 of the first hydraulic circuit 410 and the outlet line 730 of the second hydraulic circuit 420 are connected to the third connection line 530 inside the second block 20, and the outlet valve 413a of the first hydraulic circuit 410 is a normally closed solenoid valve, and an outlet valve 730a of the second hydraulic circuit 420 is a normally closed solenoid valve.

A simulator line 750 is provided with a simulator device 760 and connects the second connection line 720 to the third connection line 530. The simulator line 750 is provided with a simulator valve 750a and a check valve 750b in parallel in front of the simulator device 760 to control the flow of a fluid toward the simulator device 760.

The second connection line 720 is provided with an inspection valve 720a and a check valve 720b arranged in parallel between a joining point of the simulator line 750 and the second master chamber 802. The inspection valve 720a is provided as a normally closed type solenoid valve, and when needed, closes to the second connection line 720 and operates the hydraulic pressure supply device 300 to diagnose whether the simulator device 760 is stuck.

The simulator device 760 includes a simulator chamber 761 provided to store oil, a reaction force piston 762 that changes the volume of the simulator chamber 761, and a reaction force spring 763 that provides an elastic force to the reaction force piston 762.

The above description of the present disclosure is for illustrative purposes, and a person having ordinary skilled in the art should appreciate that other specific modifications may be easily made without departing from the technical spirit or essential features of the present disclosure.

The invention claimed is:

1. An electronic brake system comprising:
a master cylinder including a first piston connected to a pedal and a second piston configured to partition a first master chamber and a second master chamber provided in front of the first piston;
a reservoir in which a braking fluid is stored, the reservoir connected to the first master chamber by a first reservoir passage, and connected the second master chamber by a second reservoir passage;
a hydraulic pressure supply device configured to generate a hydraulic pressure by an electrical signal output in response to a displacement of the pedal;
an electronic control unit configured to control the hydraulic pressure supply device and various valves based on pedal displacement information;
a first connection line configured to connect the first master chamber to a first hydraulic circuit for controlling a hydraulic pressure transmitted to one pair of wheel cylinders;
a second connection line configured to connect the second master chamber to a second hydraulic circuit for controlling a hydraulic pressure transmitted to another pair of wheel cylinders; and
a third connection line configured to connect the hydraulic pressure supply device to the reservoir,
wherein a mechanical part including the reservoir and the master cylinder is installed in a first block, and an electronic part including the hydraulic pressure supply device, the first hydraulic circuit, the second hydraulic circuit, and the electronic control unit is installed in a second block, and
each of the first connection line, the second connection line, and the third connection line is provided to connect the first block to the second block,
wherein the first and second hydraulic circuits include:
a wheel line connected to the wheel cylinder;
an inlet line provided with a check valve, which allows only a one-way fluid movement from the wheel line toward the hydraulic pressure supply device, and a normally open inlet valve in parallel; and
an outlet line provided with an outlet valve and connected to the wheel line,
wherein the second piston includes a reaction force piston provided to be displaceable by a hydraulic pressure of the braking fluid accommodated in the first master chamber, a damping piston configured to change a volume of the second master chamber, and an elastic member arranged between the reaction force piston and the damping piston,
wherein the master cylinder is an integrated master cylinder that incorporates a simulation device, and includes a simulation chamber provided between the reaction force piston and the damping piston and accommodating the elastic member.

2. The electronic brake system of claim 1, wherein:
the first connection line is provided with a first cut valve and connects the first master chamber to the wheel line of the first hydraulic circuit;
the second connection line is provided with a second cut valve and connects the second master chamber to the outlet line of the second hydraulic circuit;
the outlet line of the first hydraulic circuit is connected to the third connection line inside the second block;
the outlet valve of the first hydraulic circuit is a normally closed solenoid valve; and
the outlet valve of the second hydraulic circuit is a normally open solenoid valve.

3. The electronic brake system of claim 2, wherein the second connection line is provided with an orifice between the second cut valve and the second master chamber.

4. The electronic brake system of claim 1, further comprising a fourth connection line provided to connect the first block to the second block, and connect the simulation chamber to the outlet line of the second hydraulic circuit.

5. The electronic brake system of claim 4, further comprising a simulation line configured to connect the fourth connection line to the reservoir, wherein the simulation line is provided with a simulator valve and a check valve arranged in parallel.

6. The electronic brake system of claim 1, wherein:

the first connection line is provided with a first cut valve and connects the first master chamber to the wheel line of the first hydraulic circuit;

the second connection line is provided with a first pipeline and a second pipeline, which are connected to the second master chamber and the simulation chamber, respectively, and join each other and extend toward the outlet line of the second hydraulic circuit;

the first pipeline is provided with a first mechanical valve;

the outlet valve of the first hydraulic circuit is a normally closed solenoid valve; and the outlet valve of the second hydraulic circuit is a normally open solenoid valve.

7. The electronic brake system of claim 6, further comprising a third pipeline provided with a second mechanical valve and connecting the second reservoir passage to the simulation chamber.

8. The electronic brake system of claim 7, further comprising a fourth pipeline configured to connect the hydraulic pressure supply device to the first and second mechanical valves, wherein the first and second mechanical valves are each provided as a hydraulic operating valve that is normally opened by a piston pressurized by a spring inside a housing and blocks a passage by an opening and closing member provided on the piston when a hydraulic pressure is supplied to the fourth pipeline.

9. The electronic brake system of claim 7, wherein the outlet line of the first hydraulic circuit is connected to the outlet line of the second hydraulic circuit to extend to the second connection line.

10. The electronic brake system of claim 1, wherein the hydraulic pressure supply device includes:

a hydraulic pressure supply portion provided with a first pressure chamber and a second pressure chamber;

a control valve portion provided with various valves for adjusting a hydraulic pressure supplied from the hydraulic pressure supply portion toward the first and second hydraulic circuits; and a dump valve portion provided with various valves for adjusting a hydraulic pressure supplied from the hydraulic pressure supply portion toward the third connection line.

11. The electronic brake system of claim 1, wherein a part of the first connection line connecting the first block to the second block includes a hose that allows a large flow rate and has a resilience.

12. The electronic brake system of claim 1, wherein the second block is formed as a single module disposed away from the first block, and the electronic part including the hydraulic pressure supply device, the first hydraulic circuit, the second hydraulic circuit, and the electronic control unit are positioned in the second block formed as the single module.

13. An electronic brake system comprising:

a master cylinder including a first piston connected to a pedal and a second piston configured to partition a first master chamber and a second master chamber provided in front of the first piston;

a reservoir in which a braking fluid is stored, the reservoir connected to the first master chamber by a first reservoir passage, and connected the second master chamber by a second reservoir passage;

a hydraulic pressure supply device configured to generate a hydraulic pressure by an electrical signal output in response to a displacement of the pedal;

an electronic control unit configured to control the hydraulic pressure supply device and various valves based on pedal displacement information;

a first connection line configured to connect the first master chamber to a first hydraulic circuit for controlling a hydraulic pressure transmitted to one pair of wheel cylinders;

a second connection line configured to connect the second master chamber to a second hydraulic circuit for controlling a hydraulic pressure transmitted to another pair of wheel cylinders;

a third connection line configured to connect the hydraulic pressure supply device to the reservoir; and a simulator line provided with a simulator device and connecting the second connection line to the third connection line, wherein a mechanical part including the reservoir and the master cylinder is installed in a first block, and an electronic part including the hydraulic pressure supply device, the first hydraulic circuit, the second hydraulic circuit, and the electronic control unit is installed in a second block, and each of the first connection line, the second connection line, and the third connection line is provided to connect the first block to the second block, wherein the first and second hydraulic circuits include:

a wheel line connected to the wheel cylinder;

an inlet line provided with a check valve, which allows only a one-way fluid movement from the wheel line toward the hydraulic pressure supply device, and a normally open inlet valve in parallel; and an outlet line provided with an outlet valve and connected to the wheel line, wherein:

the first connection line is provided with a first cut valve, and connects the first master chamber to the wheel line of the first hydraulic circuit;

the second connection line is provided with a second cut valve, and connects the second master chamber to the outlet line of the second hydraulic circuit;

the outlet line of the first hydraulic circuit and the outlet line of the second hydraulic circuit are connected to the third connection line inside the second block; and the outlet valve of the first hydraulic circuit and the outlet valve of the second hydraulic circuit are each provided as a normally closed solenoid valve.

14. The electronic brake system of claim 13, wherein the simulator line is provided with a simulator valve and a check valve that are installed in parallel between the second connection line and the simulator device.

15. The electronic brake system of claim 13, wherein the simulator device includes:

a simulator chamber provided to store oil;

a reaction force piston configured to change a volume of the simulator chamber; and a reaction force spring configured to provide an elastic force to the reaction force piston.

16. The electronic brake system of claim 13, wherein the second connection line is provided with an inspection valve and a check valve arranged in parallel between a joining point of the simulator line and the second master chamber.

* * * * *